United States Patent [19]

Kamvachirapitag

[11] 4,202,366
[45] May 13, 1980

[54] AUTOMATIC FLOATING ROOF DRAIN VALVE

[75] Inventor: Bhinyo Kamvachirapitag, Sriracha, Thailand

[73] Assignee: Exxon Research & Engineering Co., Florham Park, N.J.

[21] Appl. No.: 957,542

[22] Filed: Nov. 3, 1978

[51] Int. Cl.² .............................................. B65D 87/18
[52] U.S. Cl. ...................................... 137/172; 220/219
[58] Field of Search ........................... 220/219; 137/172

[56] References Cited

U.S. PATENT DOCUMENTS

| | | | |
|---|---|---|---|
| 1,801,172 | 4/1931 | Patterson | 220/219 X |
| 2,551,404 | 5/1951 | Wiggins | 137/172 |
| 2,931,534 | 4/1960 | Wiggins | 220/219 |
| 3,074,587 | 1/1963 | Jennings | 220/219 |
| 3,491,911 | 11/1970 | Fraylick | 220/219 |

Primary Examiner—Alan Cohan
Attorney, Agent, or Firm—F. Donald Paris

[57] ABSTRACT

A drain valve for a floating roof tank, employing a float for controlling the opening and closing of the valve. The buoyancy of the float is adjusted by means of a calibration weight such that the float is buoyant in water and sinks in oil. The inlet into the valve compartment is separated from the float and valve seat compartments by partitions which prevent the valve from prematurely closing because of forces set up by the velocity of fluid flow through the system and also due to the reduction of fluid density because of air bubbles.

10 Claims, 6 Drawing Figures

AUTOMATIC FLOATING ROOF DRAIN VALVE

BACKGROUND OF THE INVENTION

The present invention relates to storage tanks and more particularly to those of the floating roof variety which employ drain valves. In connection with the drainage of floating roof storage tanks, it has been generally known to provide storage roof drain valves which employ floats that float in water and sink in oil. One such valve has been marketed by Sysco Company under the name "Sysco Ball Valve". This particular type of valve generally has been found to be troublesome because of problems experienced with self-starting as well as sticking during operation caused by various valve components which are in sliding contact. Other prior art valves are disclosed in U.S. Pats. Nos. 1,801,172 of Patterson; 2,931,534 of Wiggins; 3,074,587 of Jennings; and 3,491,911 of Fraylick et al. In Patterson the valve is closed by a trigger mechanism activated by means of a float which is lifted by leaking fluid. The Patterson valve automatically shuts off the roof drain outlet when the roof drain line is broken. Wiggins relates to improved emergency drain for a floating roof. It does not function as a normal drain but only under emergency purposes. The Jennings valve automatically opens the roof drain outlet when it rains and shuts when it does not rain. The valve is controlled by means of a diaphragm; its opening and closing are effected by a differential pressure on the diaphragm which is created by the water in the roof drain line and the liquid in the tank. It has deficiencies in that there is some amount of continuous escape and also need for a second tank nozzle for balancing the line, and is relatively unreliable at low roof positions because there is less differential fluid pressure to operate the valve. This differential pressure directly varies with the height of the liquid in the tank. In Fraylick et al the valve will operate generally the same as that of the present invention disclosed by leaking oil which dissolves the oil soluble block which in turn activates the valve opening. In this valve some oil can leak out prior to the valve closing and also the drain line has to be cleaned of any oil contamination.

It is therefore apparent that there is a need for a reliable valve which is basically simple, can be conveniently and easily attached to the drain outlet, and does not permit oil to escape.

SUMMARY OF THE INVENTION

The present invention overcomes the deficiencies of the prior art valves by providing an automatic roof drain valve which closes the roof drain outlet when the roof drain line is broken or leaks. The valve opening and closing is controlled by a float which floats in water and sinks in oil because of the difference in specific gravity between water and oil. The valve according to the invention basically has its float buoyancy adjusted by means of calibrating weights so that the float is buoyant in water and sinks in oil. A plurality of partitions separate the valve compartment from the float compartment to prevent premature closing of the valve caused by forces which may be set up by the velocity of the fluids flowing into the system and the reduction of fluid density by air bubbles which will cause the float to sink.

DESCRIPTION OF THE PREFERRED EMBODIMENTS

Figure 1:
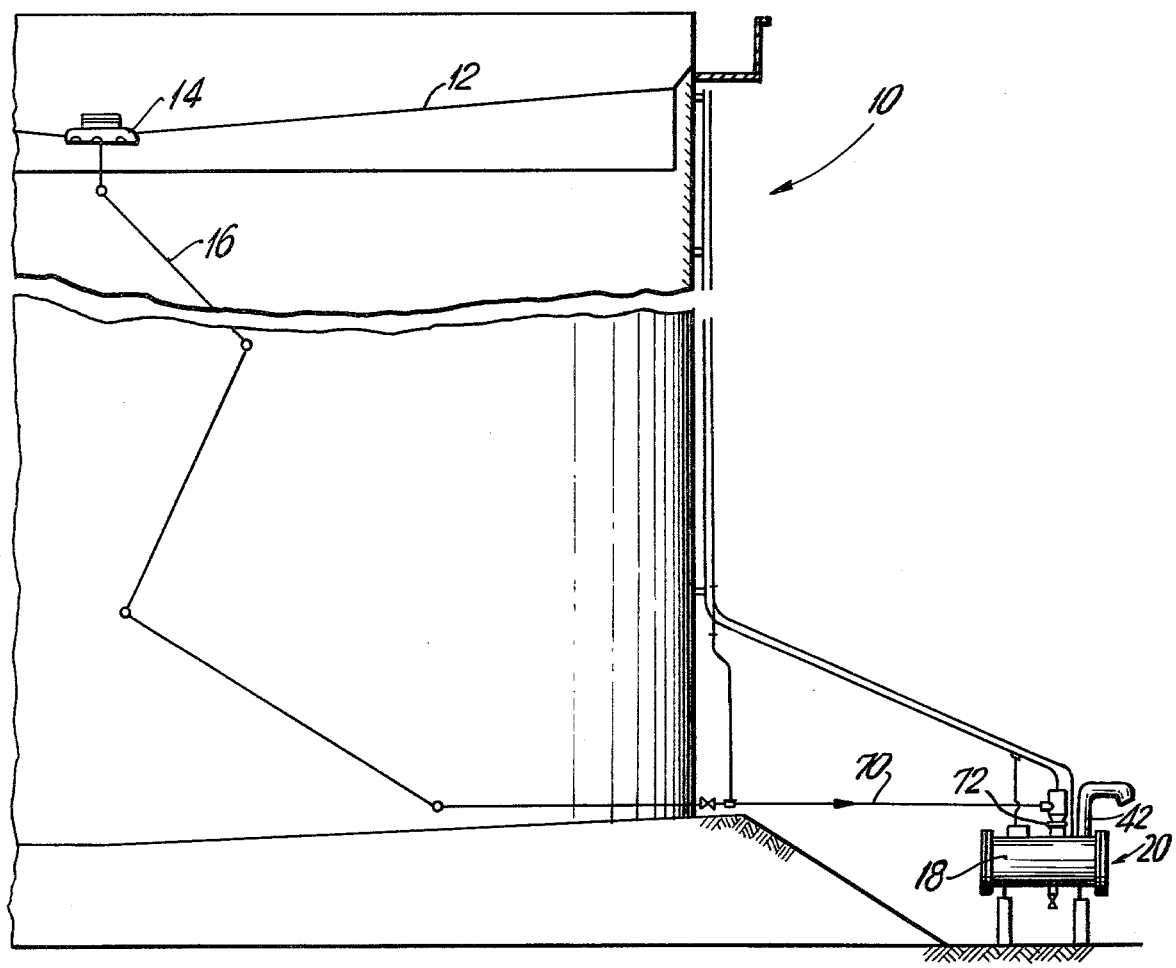
FIG. 1 illustrates an overall schematic view of an oil storage tank with a floating roof having a roof drain valve constructed and arranged according to the present invention.
Figure 5:
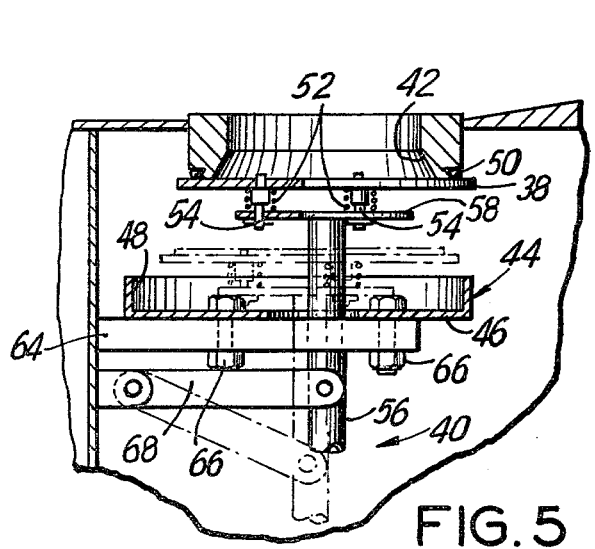
FIG. 5 is an enlarged view of the valve plate employed in the valve according to the present invention.

Referring to FIG. 1, there is generally shown an oil storage tank 10 having a floating roof 12 with a drain 14 incorporating a vortex breaker which provides for smooth drainage of water from the roof surface. Any water which may collect on the floating roof will be drained through the drainage line 16 into the main valve chamber 18. The valve system, generally designated as 20, basically comprises the main cylindrical chamber 18 which is essentially separated into a buoy compartment 22 at one end, a valve plate compartment 24 at the opposite end, and a flow passage compartment 26 situated between the aforementioned compartments. In the buoy compartment is a buoy member 28 constructed of a steel pipe section, designed to float in water and sink in oil. The buoy may be provided with calibrated weights and is connected so that the buoy moves up and down in its compartment in a vertical direction. The valve in its lower position in solid lines is shown sinking in oil, whereas in its upper position the buoy floats in water slightly offset laterally from the buoy position when sunk. The buoy is pivotally mounted at the bottom of the buoy by means of a pivot arm 30 which is hinged at 31 and at the opposite end of the arm is fixed pivot point 60 for permitting the buoy to pivot up and down. The pivot connections also can accommodate some limited degree of rotational movement. The buoy compartment is essentially defined by a first partition 34 and the end cover or wall 35 of the valve body. The linkage for the valve is basically disposed and located in the valve plate compartment 24. Spaced from the opposite end wall 37 of the valve chamber is a second partition 36 also spaced from the first mentioned partition 34. A valve plate 38, designed for dispositon in an open and closed position depending on the relative position of the buoy with which it is connected through a linkage 40, is shown in its upper closed position against the bottom of the valve chamber outlet 42. When the valve plate moves down into its open position fluid flow can pass out of the valve chamber through the outlet and the plate in its extreme downward position is disposed in a shelter member 44 to prevent damage to the valve plate as the fluid flows through the system. This shelter or protective cover or casing comprises annular disc with a flat bottom 46 and a peripheral upstanding wall 48, and is open at its upper end for receiving the valve plate at least partially therein. The valve plate itself comprises a disc which, when in its closed position, abuts against the seal 50 at the valve body outlet. The valve plate is normally urged upwardly by means of the springs 52 mounted around three posts 54 (only two are shown) which are welded to the valve plate and mounted on the lower spaced valve plate mounting member 58 which is secured to the main vertical linkage member 56. The valve plate 38 and the fixed posts which become an integral part can slide on the mounting member 58 through its three holes. Therefore, the vertical flexibility is provided for the valve plate to perfectly sit on the valve chamber outlet 42. The member 56 is fixed at its upper end with the valve plate mounting member 58 (e.g. welded) and its bottom end is pivotally connected at an end of shorter moment arm of the buoy pivot arm 30 opposite from the pivot arm end connection with the buoy. The pivot arm 30 is mounted for pivotal movement at 60 on the bracket 62 which is secured to partition 36. The opening at the bottom of partition 36 accommodates movement of the arm 30. The valve plate shelter 44 is fixedly mounted to the partition 36 by means of an outward extending longitudinal brackerts 64 which is secured by bolts and nuts 66 with the shelter 44. Directly beneath the shelter is further linkage 68. Also pivotally supported relative to the partition 36, for further maintaining the main valve plate support member 56 (particularly at its upper end) in an essentially vertical position during movement and when the valve is closed. Thus, the valve plate and its associated linkage member 56 move up and down in response to the opposite movement of the buoy.

The partition 36 which forms the valve compartment is secured (e.g. by welding) at its upper end to the upper wall of the valve body and is generally circular in shape and has at its bottom end an opening 74 which can be of any convenient shape, extending essentially transversely across the valve body for permitting flow received in the flow compartment to pass through the opening 74 into the valve plate compartment. The other partition 34 which forms the buoy compartment is also mounted such as by welding to the valve body at its sides, is spaced at the top from the vessel for the oil to flow into the buoy compartment in case the oil leaks from the tank, and at the bottom is spaced above the bottom of the valve body for permitting the liquid flow to fill the buoy compartment. The partition 34 is formed with a pair of notches or slots 76 which permit the pivot arm connecting the buoy with the valve plate linkage to freely move without interfering with the partition.

Figure 6:
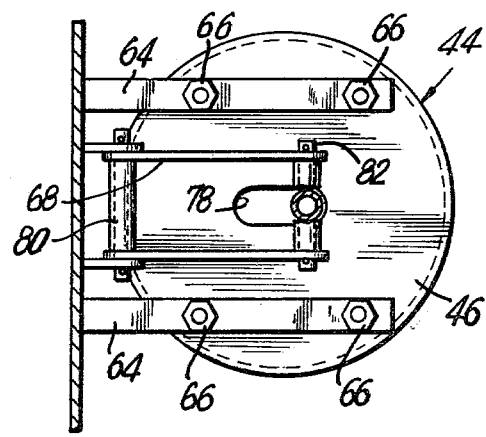
FIG. 6 is a bottom plan view of the valve plate and associated linkage.
Figure 2:
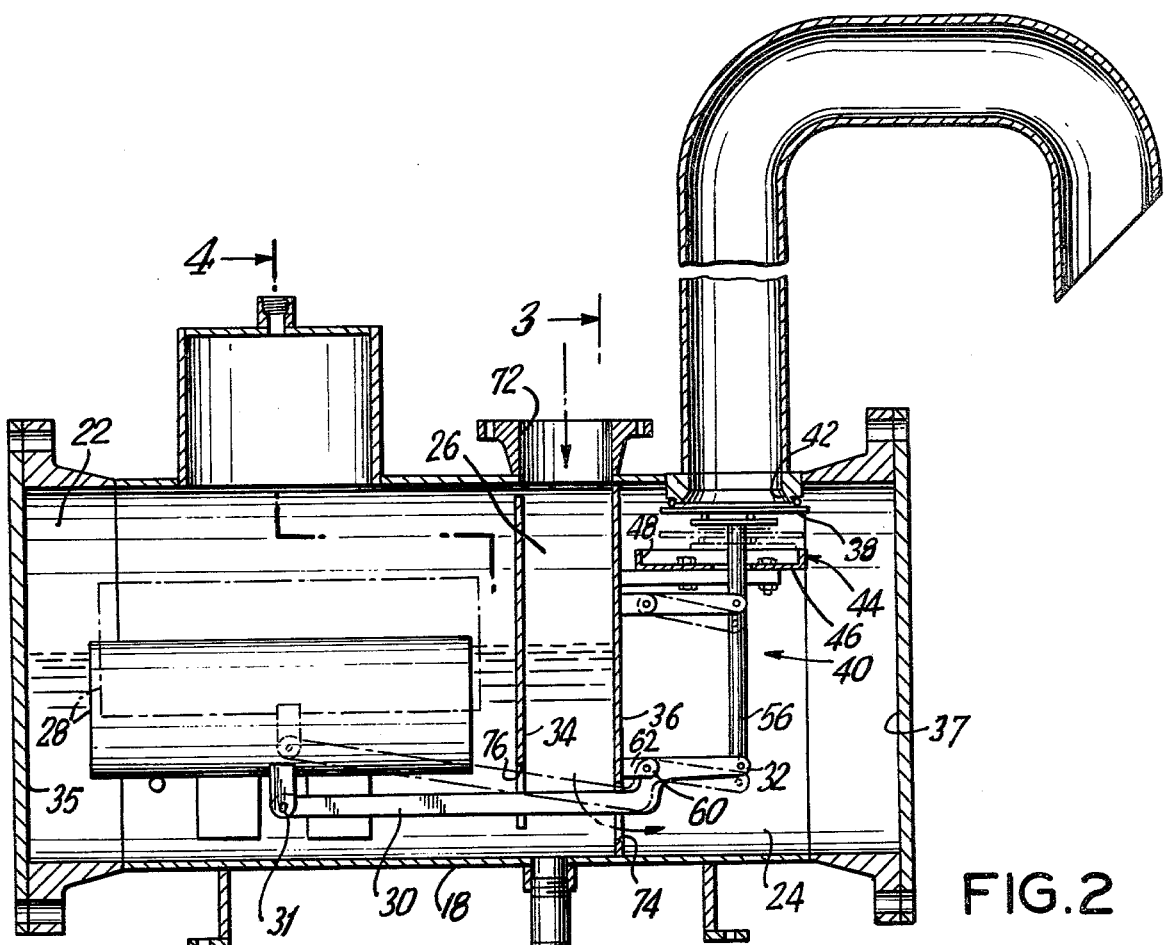
FIG. 2 illustrates an enlarged cross-sectional view of the valve according to the present invention as generally shown in FIG. 1.
Figure 3:
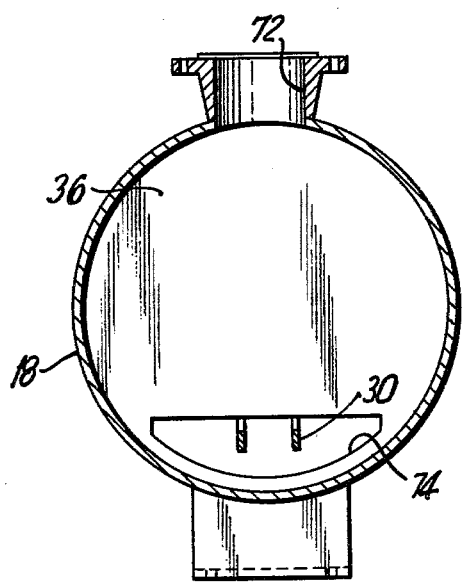
FIG. 3 is a cross-sectional view taken substantially on the line 3—3 of FIG. 2.
Figure 4:
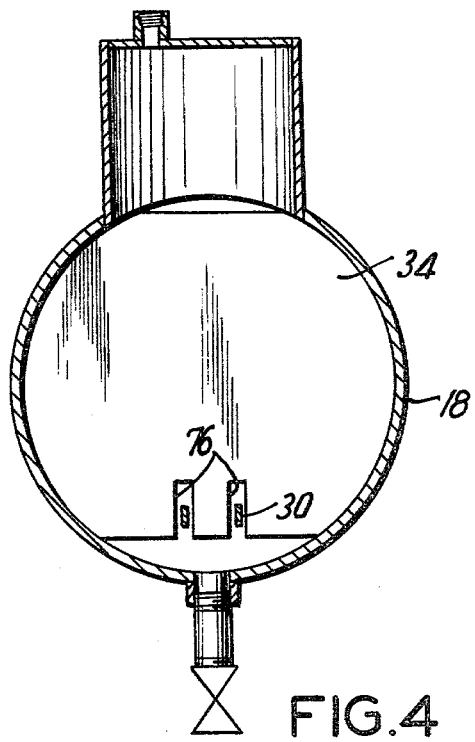
FIG. 4 is a cross-sectional view taken substantially on the line 4—4 of FIG. 2.

As best shown in FIG. 6, the shelter is provided with an elongated slot 78 which extends in the longitudinal direction of the cylinder to accommodate sidewise or transverse movement of the main linkage member as it is moved up and down between open and closed positions of the valve plate. The linkage 68 is pivotally mounted to the partition and is journaled about the shaft 80 at its partition end and at its free end also has a journaled shaft 82 for for connection with the valve plate support member 56. As previously described, the outward extending brackets 64 are bolted to the shelter in a conventional fashion and support the shelter at its desired location beneath the valve body outlet.

The system operates such that if only water is being drained from the floating roof, then the water passes through the line 70 into the valve body via the inlet 72 which leads into the flow passage compartment. As water is received it spreads under the partition which is spaced above the bottom of the vessel and when the level rises into contact with the buoy, the buoy will float on the water. This will cause the longer moment arm of pivot arm 30 to rise or move upward as the water level rises. The opposite end of arm 30 will pivot downward which in turn causes the valve plate to move downward, thereby opening the outlet 42 from the body and permitting the water to drain out from the outlet chamber as the water level rises therein. When the water is flowing out of the valve body, the buoy floats at its highest position and rests against the upper cylindrical surface of the valve body, and the valve plate opens fully and rests in the valve shelter 44. When oil is received in the buoy compartment of the valve body, then the oil will locate on top of the water and the buoy will sink in the oil layer, which causes the linkage 30 connected to the buoy to pivot downward with corresponding upward movement of the opposite end of the arm 30 such that the valve plate is urged upward into its closed position. This prevents any flow of oil from passing out of the valve body.

Having thus set forth the present invention in its preferred embodiment, it will be apparent that various modifications and various variations may be made thereto without departing from the true spirit and scope of the subject invention.

What is claimed is:

1. A valve system for use with a floating roof of a storage tank having a roof drain outlet, comprising, in combination: a valve body operably connected with the floating roof for automatically closing the roof drain outlet; said body having an inlet passage means and outlet means and including first and second compartments, wherein said inlet passage means is for receiving fluid flow from said roof drain outlet; valve means in said first compartment for opening and closing said outlet means; float means having predetermined buoyancy disposed in said second compartment, for controlling the opening and closing of said valve means, said float means being constructed and arranged to be buoyant in water and sink in oil; partition means separating said inlet passage means from said first and second compartments for preventing premature closing of said valve means; and linkage means connecting said valve means with said float means for controlling the opening and closing of said valve body outlet.

2. The valve system of claim 1 including a third flow receiving passage compartment situated between said first compartment and said second compartment, said inlet means directing flow from said roof into said third compartment.

3. The valve system of claim 2 wherein said partition means comprises a pair of spaced plates defining said third compartment, a first one of said partition plates defining an end of said second compartment and a second one of said partition plates forming an end of said first compartment, and one of said plates also providing a mounting support for said linkage means.

4. The valve of claim 1 including flow passage means between said first and second compartments.

5. The valve system of claim 3 wherein said first and second annular plates are secured to said valve body and are constructed and arranged for permitting restricted fluid flow between said first and second compartments and for eliminating interference with the movement of said linkage.

6. The valve system of claim 1 wherein said linkage means includes pivot arm mounted for pivotal movement between the ends thereof and connected at one end with said float means and at the opposite end connected with said valve means, for operably causing said valve means to move in correspondence with the movement of said float.

7. The valve system of claim 1 including shelter means for housing said valve means when said valve means is disposed in its open position, thereby preventing damage to said valve means as a result of fluid flow exiting from said valve body through said outlet.

8. The valve of claim 7 wherein said shelter means includes an elongated opening transversely disposed of the direction of movement of said valve means, for accommodating up, down and limited transverse movement of said linkage means.

9. The valve of claim 3 wherein said second plate comprises an elongated opening at the bottom thereof.

10. The valve of claim 3 wherein said first plate has its bottom edge spaced above the bottom of said valve body, and its top edge spaced below the top of said valve body.

* * * * *